UNITED STATES PATENT OFFICE.

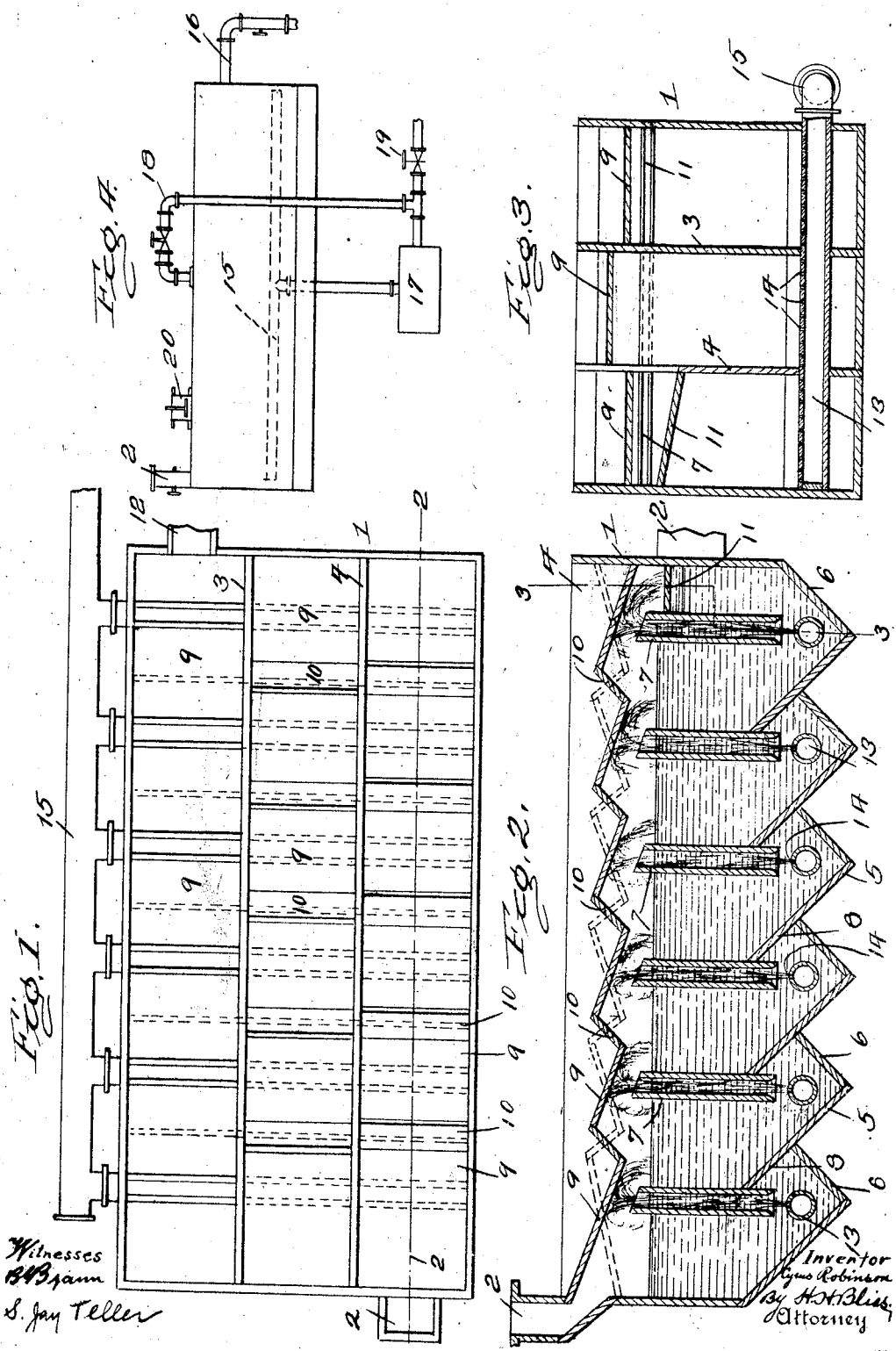

CYRUS ROBINSON, OF MOUNT VERNON, NEW YORK, ASSIGNOR TO METALLURGICAL ENGINEERING & PROCESS CORPORATION, A CORPORATION OF NEW YORK.

AGITATOR FOR ORE TREATMENT.

1,204,069.

Specification of Letters Patent.

Patented Nov. 7, 1916.

Application filed October 1, 1910, Serial No. 584,868. Renewed March 30, 1916. Serial No. 87,850.

*To all whom it may concern:*

Be it known that I, CYRUS ROBINSON, a subject of the King of Great Britain and Ireland, residing at Mount Vernon, in the county of Westchester and State of New York, have invented certain new and useful Improvements in Agitators for Ore Treatment, of which the following is a specification, reference being had therein to the accompanying drawing.

This invention relates to improvements in devices for agitating ore pulp or other material containing soluble ingredients to aid the action of a suitable solvent such as potassium cyanid.

It is well known that in many cases the principal difficulties and expenses incident to the chemical extraction of metal values from ores is due to the necessity for mechanically agitating the solution and ore and to the time required for completing the process. These difficulties are especially prevalent in the treatment of slimes, or of pulp containing an unduly large proportion of slimes. It is also well known that stirring a mixture of solvent solution and ore continuously does not result in more than approximate breaking up of the mixture as the solution and the particles of ore tend to move together in the same relative positions. It is probably correct to state that a particle of ore containing metal is surrounded by a film of the solution and that this immediate film or envelop of solution becomes very quickly saturated. The further dissolving of metal however practically stops until the film of saturated solution can be removed from the particle and replaced by a new film of active solution. That this condition exists is borne out by the fact that it is found in plants using the percolation process that the first treatment with a strong solution merely "loosens" the values but does not remove them. Several subsequent washings with weaker solutions and fresh water are needed to remove the values, *i. e.* to break up and carry away the films of strong value containing solution which have formed about the ore particles.

One of the principal objects of my invention therefore is to provide a means for vigorously agitating the mixture of solution and ore so that the films of saturated solution are continually broken up and separated from the ore particles and whereby there is positive assurance that all of the ore and solution receives the same treatment during the travel through the agitator.

A further object of my invention is to provide improved means for aerating the solution during agitation. According to the well known Elsner equation—

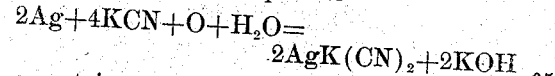

$$2Ag + 4KCN + O + H_2O = 2AgK(CN)_2 + 2KOH$$

a certain amount of oxygen is needed for the dissolving of the values. It has even been noted that strong cyanid solutions are disproportionately inactive, largely on account of the insufficient supply of oxygen dissolved in them. It is therefore evident that a certain amount of aeration is very desirable. It has been observed however that an excess of oxygen is destructive of cyanid, and I have therefore provided means whereby an accurately regulated supply of oxygen may be intimately mixed with the solvent.

In the accompanying drawings which form a part of this specification, Figure 1 is a plan view of an agitator embodying my invention, part of the plates connecting the baffle boards being removed. Fig. 2 is a cross sectional elevation along the line 2—2 of Fig. 1. Fig. 3 is a cross sectional elevation along the line 3—3 of Fig. 2. Fig. 4 is a diagrammatic view showing a modified form of my invention.

Referring to the drawings, 1 represents as a whole the tank or reservoir into which the material is fed and in which it is treated.

2 is the inlet for the pulp or mixture of pulverized ore and solution. Before reaching the inlet 2, the ore may be properly pulverized in a tube mill or otherwise and mixed with the proper quantity of solution of potassium cyanid or other solvent.

It is to be understood that the pulp may contain both sands and slimes or if preferred these may be separated and treated in separate agitators. As my improved agitator is well adapted for the treatment of slimes, the whole ore mass may be slimed if it is found that the increased percentage of extraction makes it advisable to do so.

The tank 1 as shown in the drawings is divided into preferably three longitudinal compartments by means of vertical partitions 3 and 4.

The arrangements of parts in all of the compartments are similar and I will therefore particularly describe only those in the first compartment shown in Fig. 2. The bottom of the compartment is saw toothed in shape and is made up of a series of boards or plates 5, 5, inclined downward and away from the inlet 2, and a series of boards or plates 6, 6, which join the bottoms of the plates 5, 5 and extend diagonally upward and away from the inlet 2.

7, 7 represent a series of rectangular tubes or open ended boxes which extend vertically and are positioned transversely across the compartment. The center line of each box is preferably vertically above the joint between a pair of plates 5, 6. If preferred the boxes 7, 7 can take the form of two parallel partitions extending perpendicularly across the compartment. The tops of the boxes 7 are preferably beveled and inclined downward and away from the inlet 2. Each of the plates 5 is provided with a rearward extension 8, which engages at its rear edges with the forward side of the corresponding box 7.

Above each of the boxes 7 is a baffle plate 9 which is inclined downward and forward. Connecting the adjacent ends of each pair of baffle plates 9, 9 is a plate 10 which is inclined upward and forward. The plates 10 may, if preferred, be made removable.

Between the forward side of the last box 7 and the end of the tank is located an inclined discharge board 11, which serves to transfer ore and solvent solution from the first compartment to the second compartment.

The construction of the second compartment is the same as that of the first except that all of the parts are in reversed position in order to permit the movement of the liquid in the opposite direction. At the end of the second compartment is a transfer board similar to 11, which serves to discharge the material into the third compartment which is similar in construction to the first. This third compartment is provided with an outlet trough 12.

Across the bottom of the tank and extending through all three compartments is a series of parallel transverse pipes 13, 13, each pipe being located vertically beneath the bottom of one of the boxes 7. Each pipe 13 is provided in its upper side with a series of small holes 14. A main 15 is connected with each of the pipes 13, the end of the main being connected with a pump or compressor for the supply of a suitable liquid or gas.

The operation of the device is as follows, it being assumed that air under pressure is being supplied to the main 15 and the branch pipes 13. A mixture or ore and a solution of solvent, such as cyanid, is supplied through the inlet tube. This mixture fills the space or receptacle between the end of the tank and the rear side of the box 7. The pressure in the pipe 13 however forces a series of air jets outward and upward through the holes 14. These upward moving jets of air carry with them a certain amount of the mixture and because of the confining influence of the walls of the tube 7 a considerable velocity is attained which causes the mixture of air, ore and solution to impinge against the baffle board 9, where on account of the inclination of the baffle board a considerable portion of it is deflected into the space between the first and second boxes. The extended rear edges of the boxes serve to direct the greater part of the deflected material into the next adjacent space or receptacle and to prevent all except a small portion of it from returning to the receptacles with which the lower ends of the boxes are connected. When a sufficient amount of liquid has accumulated in this second space it is forced upward through the second box 7 into the third space. This process is continued until the liquid finally reaches the last space in the third compartment from which it passes out through the trough 12.

It is to be noted that every part of the mixture is broken up into very fine particles not only once but a number of times before it can reach the discharge outlet. The violent impact of the particles of ore against the baffle boards 9, 9 tends to separate them from their outer coating of solvent so that they are exposed for the renewed action of fresh solvent. I have found in actual practice that by means of an agitator embodying my invention it is possible to dissolve about eighty-five per cent. of the soluble metals from ore in about fifteen minutes.

If preferred the cover plates 10 may be removed though I prefer to operate the agitator with them in place as they tend to prevent any spray passing upward from the interior of the tank.

In the foregoing description of the operation of my device, I have assumed that compressed air is supplied to the pipes 13. However it will be apparent that a gas other than air may be used or that if preferred a liquid such as fresh solvent solution may be used.

It is well known that an excess of oxygen in the case of the cyanid process results in the rapid destruction of the cyanid. In the modification shown diagrammatically in Fig. 4, I have provided a system whereby the amount of oxygen admitted to the agitator may be regulated. The agitator shown in Fig. 4 is similar to that shown in the other figures, with the exception that a closed outlet pipe 16 is substituted for the open trough 12. 17 is an air compressor which supplies air to the main 15. The suction for the compressor is taken from the top of the agitator tank 1 by means of a pipe 18. This pipe is also preferably provided with an inlet valve 19 which communicates with the atmosphere. The top of the tank 1 is preferably provided with a relief valve 20.

In the operation of this modification of my invention the top of the tank is entirely closed so that all air discharged through the openings 14 in the pipes 13 will be confined and again drawn out through the pipe 18. In this way a closed system is provided and after the oxygen of the air has been once exhausted no more is admitted except at the will of the operator when the valve 19 may be opened. By properly adjusting this valve 19, it is possible to take in through it a sufficient amount of fresh air to supply the oxygen needed for the proper operation of the cyanid process, all excess air passing out through the relief valve 20. This modified form of my invention is especially adapted for use in very dry climates where otherwise the evaporation of the solution is very rapid.

What I claim is:—

1. In a device of the class described, the combination of a receptacle, a baffle plate, means for projecting separated minute sub-masses of a mixture of ore and solvent solution from the receptacle violently against the said plate, and a second receptacle for receiving the mixture deflected from the said plate, substantially as set forth.

2. In a device of the character described, the combination of a series of receptacles for a mixture of ore and solvent solution, a series of baffle plates and means for forcing a part of the mixture from one receptacle against the baffle plate, from which a portion of it is deflected into the next adjacent receptacle, substantially as set forth.

3. In a device of the class described, the combination of a series of adjacent receptacles for a mixture of ore and solvent solution, a series of baffle plates, means for introducing fluid under pressure into each of the receptacles to force a portion of the mixture against one of the baffle plates in a direction such that a part of it is deflected into the next adjacent receptacle, substantially as described.

4. In a device of the class set forth, the combination of a series of receptacles, for a mixture of ore and solvent solution, a series of tubes each communicating at its lower end with one of the receptacles, a series of baffle plates each in alinement with the upper end of one of the tubes, and means for forcing the mixture through the tubes against the baffle plates, whereby a portion of the mixture from each receptacle is deflected into the next adjacent receptacle, substantially as set forth.

5. In a device of the class described, the combination of a series of receptacles for a mixture of ore and solvent solution, a series of transversely elongated vertically extending tubes each communicating at its lower end with the mixture in one of the receptacles, a series of inclined baffle plates each in alinement with the upper end of one of the tubes, a series of transverse pipes one in each receptacle in alinement with the lower end of the corresponding tube, each of the said pipes being provided with a series of holes extending toward the corresponding tube, and means for supplying gas under pressure to the said pipes, whereby jets of gas issue through the said holes and carry portions of the mixture upward through the said tubes against the baffle plates from which parts of it are deflected into the next adjacent receptacles, substantially as set forth.

6. In a device of the class described, the combination of a series of receptacles for a mixture of ore and solvent solution, the said receptacles being arranged in adjacent parallel rows, connections between the rows whereby a continuous path is established through all of the receptacles, and means whereby the mixture from each receptacle is transferred to the next adjacent receptacle in finely divided particles, substantially as set forth.

7. In a device of the class described, the combination of a closed tank having a plurality of receptacles for a mixture of ore and solvent solution, a pressure means for introducing air to the receptacles to agitate the mixture therein and move it from one receptacle to the next, and means whereby the supply of air to the pressure means may be drawn in part from the atmosphere and in part from the said tank, substantially as set forth.

8. In a device of the class described, the combination of a tank having a plurality of receptacles for a mixture of ore and solvent solution, a pressure means for introducing air to the receptacles to agitate the mixture and move it from one receptacle to the next, means whereby a part of the supply of air for the said pressure means is drawn from the atmosphere and a part from the said tank, and means for regulating the ratio between the air drawn from the atmosphere and that drawn from the tank, substantially as set forth.

9. In apparatus for treating crushed ore products to dissolve the metal contents thereof, in combination, a plurality of vats, means in each vat for circulating the charge, and means coöperatively combined with said circulating means which operate to divert into an adjoining vat a portion of the stream as it issues from said circulating means.

10. In a device of the class described, the combination of a series of adjacent receptacles each adapted to contain a mixture of ore and solvent solution, baffle plates above the receptacles, a series of tubes, each extending from one receptacle toward one of the baffle plates, one of the edges of each of the said tubes being extended upward beyond the other opposite edge, and means for forcing masses of the mixture of ore and solution through each of the said tubes whereby the major portion thereof is engaged by the baffle plate and deflected into the next adjacent receptacle which is on the opposite side of the tube from the said upward extended edge, substantially as set forth.

11. In a device of the class described, the combination of a series of adjacent receptacles, each adapted to contain a mixture of ore and solvent solution, baffle plates above the receptacles, a series of tubes, each extending from one receptacle toward one of the baffle plates, means for forcing masses of the mixture of ore and solution through each of the said tubes, whereby the major portion thereof is engaged by the baffle plate to be deflected thereby and means for directing the major portion of the said deflected masses into the receptacle which is adjacent the one from which the said tube leads, substantially as set forth.

12. In a device of the class described, the combination of a series of receptacles each adapted to contain a mixture of ore and solvent solution, baffle plates above the receptacles, and means for forcing small masses of the mixture from each receptacle against a baffle plate to be deflected thereby, and means for directing the major portion of the mixture so deflected into the next adjacent receptacle, substantially as set forth.

In testimony whereof I affix my signature, in presence of two witnesses.

CYRUS ROBINSON.

Witnesses:
 DAVID SCOTT,
 G. W. MAY.